Feb. 14, 1967   H. A. McANINCH   3,304,024
BELT RETRACTING MEANS
Filed April 19, 1963
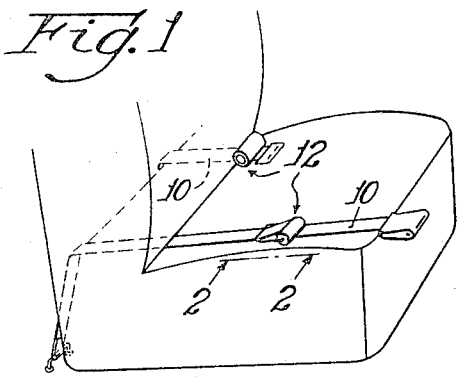
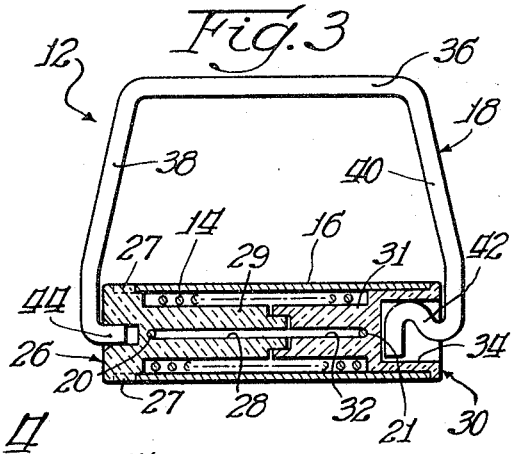
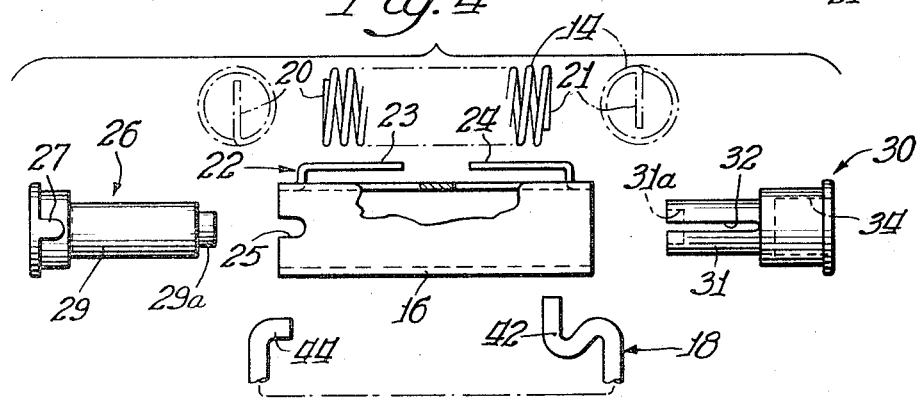
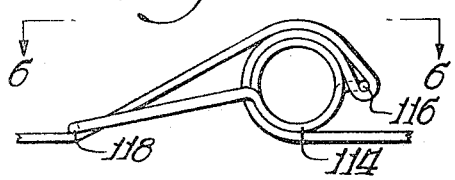
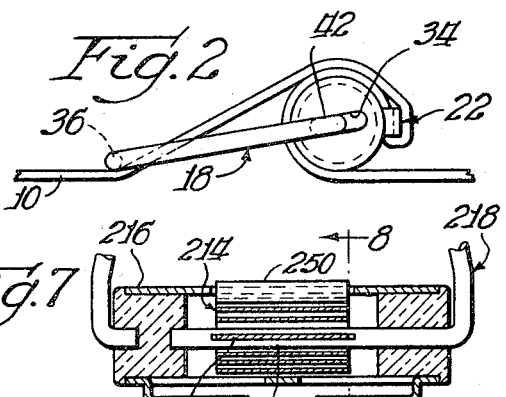
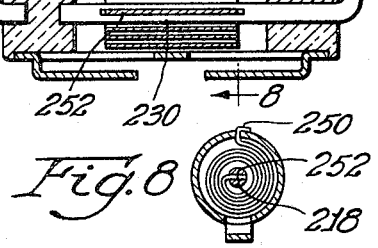
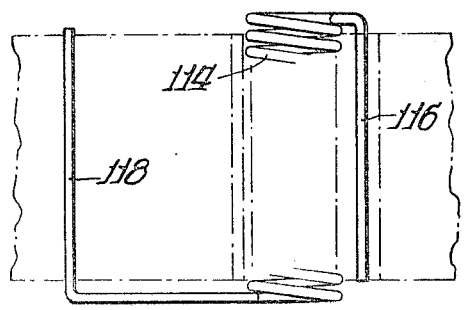
Inventor
Herbert A. McAninch
By Frank R. Thienpont Atty.

United States Patent Office 3,304,024
Patented Feb. 14, 1967

3,304,024
BELT RETRACTING MEANS
Herbert A. McAninch, Auburn, Ind., assignor to Borg-Warner Corporation, a corporation of Illinois
Filed Apr. 19, 1963, Ser. No. 274,271
2 Claims. (Cl. 242—107.11)

This invention relates to a belt take-up or retracting means and particularly such means for use in conjunction with safety belts in vehicles such as automobiles or aircraft.

One of the difficulties with presently known automobile seat belts, for example, is that when not in use the belt portions lie on the seat or become somewhat inaccessible when they slip between or behind the seats. While there have been inventions directed towards alleviating this problem, generally they have been cumbersome structures which are often complicated and expensive to manufacture. Some of these prior art belt take-up devices require, for example, a container device for each belt section, containing a reel or similar mechanism upon which the belt is reeled. In addition, some of these devices present special installation problems in that they require attachment to the flooring of the vehicle or the seat structure itself.

It is a principal object of this invention to provide a belt take-up means which is simple in structure, easy to manufacture and is inexpensive.

Another object is to provide a device which can be easily attached to belts which are already installed in automobiles, aircraft or any other pieces of equipment where such belts are used.

Another object is to provide a simple belt take-up means which has no relation to or connection with the belt anchoring means and may be attached to the belt at any desired position and subsequently adjusted to any desired position.

Another object is to provide a belt take-up means comprising a construction which rolls up the belt from both sides of the take-up means in a double layered formation thus effectively reducing the tension necessary in the energy storing means by reducing the effective length of the belt to be rolled up to substantially one-half its full length.

The foregoing and other objects and advantages of the present invention become apparent in the following detailed description thereof when read in conjunction with the accompanying drawings wherein:

FIGURE 1 is a perspective view of a seat equipped with seat belts and showing one belt section in extended position and another section in retracted position;

FIGURE 2 is a view taken along line 2—2 of FIGURE 1.

FIGURE 3 is an assembly drawing partially in section of a preferred form of the belt take-up device;

FIGURE 4 is an exploded view of the parts of the belt take-up device;

FIGURES 5 and 6 show another embodiment of a take-up means incorporating the same general concept of the preferred embodiment;

FIGURE 7 illustrates another embodiment utilizing a flat helical spring;

FIGURE 8 is a view taken along line 8—8 of FIGURE 7.

Referring now to FIGURE 1 there is illustrated generally two seat belt sections or lengths 10 in attached position on a seat and belt take-up or retraction means 12 attached at approximately the midpoint of each seat belt section. One section is shown in extended position and the other is shown in retracted position. It is noted that two take-up means would normally be used in conjunction with a complete seat belt.

Our invention comprises an independent belt retraction device which may be easily attached to a belt means. In its broadest aspects it comprises an energy storing means, a reaction member attached to the energy storing means for taking a reaction from the belt to which the device is attached and another member attached to the energy storing means upon which the belt may be reeled or wound.

A preferred embodiment of the belt take-up means 12 is shown in FIGURE 3. The take-up or retraction means comprises an energy storing means 14 illustrated here as a coil spring, a tubular member 16 for housing the spring and on which the belt is wound, and a reaction member 18 in the form of a bracket effectively connected at one end of the energy storing means 14 and at the other to the tubular member 16.

The spring in this example is formed with connecting means 20 and 21 in the form of radially inwardly extending spring end portions at each end to effectively connect the spring at one end to the tubular member 16 and at the other end to the reaction yoke member 18. An alternative energy storing means would be, for example, a flat helical spring as illustrated in FIGURE 7.

The tubular housing member 16 may be formed from a flat stamping which is then formed into a tubular design. The member 16 has formed thereon an attachment means in the form of a yoke 22 for attaching to the belt section 10. The yoke 22 may be formed as an integral part of the member 16 by stamping the arms 23 and 24 from the metal blank used to make the tubular member 16. It will be observed that a flexible belt may be easily slipped into the yoke 22 which is open at the middle portion thereof. This construction is particularly advantageous where the device is to be used on seat belts which are already installed. The yoke 22 could be a solid member, i.e., not open at the middle, and would then be more applicable to belts yet to be installed. In either case, the belt take-up means can be easily positioned at any desired position on the belt.

An end cap 26 is inserted into the left end of the tubular housing member 16 as viewed in FIGURE 3. A pair of diametrically opposed axially extending bosses 27 are formed on the left end of the cap 26. These bosses are received by slots 25 in the end of the housing member 16. Formed at the inner end of the end cap 26 is a slot 28 for receiving the connection means 20 formed at the left end of the spring means 14 as viewed in FIGURE 4. The inner end portion 29 of the end cap 26 is of a smaller diameter than the internal diameter of the member 16. Since the end cap 26 is not rotatably movable with respect to the tubular member 16, the spring 14 is in effect attached to the tubular member at this end.

Inserted into the other end of the tubular member 16 is a second end cap means 30. This end cap 30 is formed with a slot 32 at its inner end for connection to the other end of the spring means by the connecting means 21. At its outer end the end cap 30 has formed therein a slot or recess 34 for receiving a bent end portion of the reaction yoke member 18. The inner end portion 31 of the end cap means 30 is of substantially the same diameter as the inner end portion 29 of end cap 26. The diameter of the two portions 29 and 31 is effective to control the tension that may be put on the spring 14. The end caps 26 and 30 may be made of plastic or metal as desired.

The end caps 26 and 30 also have formed at the inner ends thereof respectively a complementary boss 29a and recess 31a which structure helps to keep the spring 14 centered in the assembly during the operation of the device.

The reaction member 18 in this preferred embodiment is in the form of a ring or three-sided bracket which is formed with a central bar or arm portion 36 and two side bar portions 38 and 40. One end of the side bar portion 40 has formed thereon a bent S-portion 42 which is adapted to be received in the slot 34 of end cap 30. This is one manner of connecting the reaction member 18 to the end cap 30 so that these two means will not be rotatably movable relative to each other in an assembled condition. The connection is such that in an assembled condition the reaction member 18 is effectively connected to the right end of the spring 14 as viewed in FIGURE 4. The other side bar portion 38 has formed thereon a bent end 44 which is adapted to be received in the outer end of the end cap 26.

Where a split yoke 22 is used, a spring biased safety closure device may be used, if desired. Such a device may comprise, for example, tubular latch means adapted to fit over the ends of the arms 23 and 24 and spring means for urging the latch into closed position.

In order to attach the belt take-up means to the belt the tubular member 16 with the spring attached is rotated counter-clockwise with respect to the reaction member 18 as viewed in FIGURE 2. This puts tension on the spring 14. It is then clipped to the belt section 10 approximately at the midpoint of the belt section in its extended position as viewed in FIGURE 1. The tubular member 16 is so connected to the belt that the bar portion 36 of the reaction member 18 lies on top of the belt as viewed in FIGURE 2. As the tension on the belt is relaxed by the person using it the tension on the spring is released thus tending to turn the tubular member as viewed in FIGURE 2 in a clockwise direction. This winds the belt onto the tubular member 16 in a double layer. Thus the spring need only be of such size and have such force as to be able to accommodate or as to be able to reel up essentially half a belt length 10. It will be noted from FIGURE 1 that when the belt is not in use and is in a retracted position, the belt take-up means rests snugly at the intersection of the seat and back portion of the seat.

It will be noted that the device illustrated as the preferred embodiment is made up of parts which may be easily assembled, none of the parts being permanently fastened to each other. For example, in viewing FIGURE 3 it is seen that the end cap 26 is easily removed from the tubular member 16 by pulling the side bar portion 38 out of the end cap 26. The end cap 30 also slidingly fits into the tubular member 16 and may be removed therefrom. The spring member 14 may be tensioned slightly to decrease the diameter and is then easily removable from the tubular member 16. Thus it becomes apparent that this is a device which can be sold, for example, as an unassembled kit or in the alternative as an assembled unit. The unit may be attached to seat belts which are already in position in a variety of vehicles such as automobiles or aircraft. Such ease of assembly makes replacement of parts a simple matter.

A more simplified embodiment incorporating the general concept embodied in my invention is illustrated in FIGURES 5 and 6.

For example, in FIGURE 6 there is illustrated a one piece unit comprising an energy storing member in the form, for example, of a coiled torsion spring 114 with a reeling or winding bar 116 attached at one end thereof and a reaction bar 118 attached at the other end of the spring 114.

The embodiment illustrated in FIGURE 7 also incorporates the general concept embodied in my invention. In this embodiment the energy storing means is in the form of a flat helical spring 214 which has the outer end 250 connected to the tubular member 216 and the inner end 252 connected to the reaction member 218 through the medium of a slot 230.

Thus I have advantageously provided a device which may be attached to any existing seat belt installation as well as to seat belts as originally sold. Our device also makes it unnecessary to modify the belt attachment structure, that is, the structures used to attach the seat belts to either the vehicle frame or to the seat itself. In addition it will be observed that this device is independent of the attachment structure and, therefore, has no effect on the belt tension, that is, on the hold or pull taken by the belt in response to movement of a person using the belt. When the belt is completely extended, all pull on the belt is taken directly by the belt anchoring means and the belt takeup device carries none of the tension load. Also the particular type of arrangement requires only that the energy storing means be effective to roll up half a belt length rather than a full portion of the belt length or section. In addition, this belt take-up means is very inexpensive and easy to manufacture.

While a certain preferred embodiment of the invention has been specifically disclosed, it is understood that the invention is not limited thereto as a number of variations will be readily apparent to those skilled in the art and the invention is to be given its broadest possible interpretation within the terms of the following claims.

I claim:

1. A retractor device for vehicle seat belts comprising a first larger generally U-shaped bail having its cross bar portion adapted to engage the web of a cooperative seat belt, a second smaller generally U-shaped bail coaxially mounted in respect to said first bail and having its middle portion adapted to engage the opposite face of said seat belt web when the belt is in extended condition, a cylindrically wound spring having its opposite ends operatively connected between said bails to resist relative rotation therebetween in one direction, said second bail including a cylindrical tube portion encompassing said spring, and a pair of bearing flange members disposed at the opposite ends of said tube portion providing bearings between said bails during the relative rotation thereof.

2. A retractor device as in claim 1 wherein said bearing flange members are of symmetrical size and shape and have a diameter substantially that of said second bail tube portion.

References Cited by the Examiner

UNITED STATES PATENTS

| | | | |
|---|---|---|---|
| 1,313,644 | 8/1919 | Simon | 242—107 |
| 1,657,190 | 1/1928 | Ballou | 24—68 |
| 2,541,476 | 2/1951 | Mihalyi | 242—71.1 |
| 2,814,504 | 11/1957 | Campbell | 297—388 |

FRANK B. SHERRY, *Primary Examiner.*

CASMIR A. NUNBERG, *Examiner.*

J. S. PETRIE, *Assistant Examiner.*